106. COMPOSITIONS, COATING OR PLASTIC.

84

Patented Oct. 4, 1932

1,881,180

UNITED STATES PATENT OFFICE

KARL FRANCK AND KARL DIETZ, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ACID PROOF MATERIAL AND PROCESS OF PREPARING IT

No Drawing. Application filed January 6, 1928, Serial No. 245,036, and in Germany January 8, 1927. Renewed July 28, 1932.

The present invention relates to quick-setting acid-proof cement compositions and to a process of preparing the same.

The acid-proof cements heretofore known "set" only very slowly, required too long a time for drying, and frequently did not at all harden throughout their mass. An object of the present invention, therefore, is to provide an acid-proof cement composition which is capable of setting quickly, drying quickly, and uniformly and completely hardening throughout its mass.

In our co-pending application, Ser. No. 125,325, we have described a process of preparing an acid-proof cementing composition which comprises mixing with any known water-glass solution a cement powder containing a powdered neutral chemical body which is not capable of absorbing water but possesses the property of giving with alkali a strong reaction which can be characterized by the capability of the powder to show, when boiled for two hours with 25 times the quantity of caustic soda solution of 15% strength, a loss of weight of at least 40% of the starting quantity.

The loss of weight caused by the boiling with caustic soda solution is termed in our co-pending application Ser. No. 125,325 "reaction ratio".

In further elaborating this process, we have now found that for the preparation of quick-setting acid-proof cement compositions there are especially suitable such finely-powdered metal compounds as possess the property of giving with alkali a strong reaction which can be characterized by the capability of the metal compounds to show, when boiled for two hours with 25 times the quantity of caustic soda solution of 15% strength, a loss of weight of at least 40% of the starting quantity. These substances when mixed together with water-glass eliminate the silicic acid of the water-glass and other more or less insoluble materials. We have ascertained that such substances are for instance: tungsten oxide, cryolite, and such fluorine compounds as possess the general formula:

$$Me_x Z_y F_n,$$

wherein Me stands for a metal, Z for a metal or a non-metal, metal oxide or non-metal oxide, F for fluorine, and $x$, $y$ and $n$ for whole numbers.

Furthermore we have found that the above-named substances are suitable cementing materials not only when being used alone, but also if they are added to less active cementing compositions. Generally, in order to obtain an acid-proof and self-hardening material, the said substances are added in a small quantity, for instance 3–5 per cent thereof, to a mixture of quartz sand, serving as filling material.

If the said acid-proof substances are used as cementing material, they require much less time to harden and give a considerably better cement than the hitherto known cementing compositions. The new acid-proof materials are also used for lining therewith the walls of vessels or for making slabs for covering the inside of vessels.

We obtain very convenient and useful cementing compositions for instance by the following mixtures:

(1) 950 grams of finely ground quartz sand are mixed with 50 grams of finely powdered tungsten oxide and then 400 grams of water-glass are added thereto.

(2) 950 grams of finely ground quartz sand are mixed with 50 grams of finely powdered calcium-aluminium fluoride and then 400 grams of water-glass are added thereto.

We expressly exclude from the scope of the following claims the use of silicon and silicon alloys which we have already specifically claimed in our co-pending U. S. application Ser. No. 125,325, filed July 27, 1926.

We claim:

1. The process of preparing an acid-proof cementing composition which comprises mixing with a water-glass solution a finely powdered mass containing powdered tungsten oxide.

2. The process of preparing an acid-proof cementing composition which comprises mixing with a water-glass solution a finely powdered mass containing any acid-proof filling material and powdered tungsten oxide.

3. The process of preparing an acid-proof cementing composition which comprises mixing about 950 grams of finely ground quartz sand with about 50 grams of finely powdered tungsten oxide and adding then about 400 grams of water-glass thereto.

4. Acid-proof cementing compositions comprising a mixture of a water-glass solution and a finely powdered mass containing powdered tungsten oxide, said cementing compositions requiring only a short time for setting and being very resistant to boiling water and acid solutions.

5. Acid-proof cementing compositions consisting of a mixture of a water-glass solution and a finely powdered mass containing any acid-proof filling material and powdered tungsten oxide, said cementing compositions requiring only a short time for setting and being very resistant to boiling water and acid solutions.

6. Acid-proof cementing compositions consisting of a mixture of about 950 grams of finely powdered quartz sand, 50 grams of finely powdered tungsten oxide and about 400 grams of mater-glass, said cementing compositions requiring only a short time for setting and being very resistant to boiling water and acid solutions.

In testimony whereof, we affix our signatures.

KARL FRANCK.
KARL DIETZ.